US008073560B1

(12) United States Patent
Clardy et al.

(10) Patent No.: US 8,073,560 B1
(45) Date of Patent: Dec. 6, 2011

(54) METHOD FOR CREATION OF DETAILED BODY MEASUREMENT PARTS FROM EXTRAPOLATION OF STANDARD CHART DATA BASED ON GENERIC BODY ATTRIBUTES

(75) Inventors: Robert Clardy, Renton, WA (US); Greg Hightower, Bellevue, WA (US)

(73) Assignee: N.W. Synergistic Software, Inc., Renton, WA (US)

( * ) Notice: Subject to any disclaimer, the term of this patent is extended or adjusted under 35 U.S.C. 154(b) by 970 days.

(21) Appl. No.: 12/069,442

(22) Filed: Feb. 8, 2008

Related U.S. Application Data

(60) Provisional application No. 60/900,485, filed on Feb. 9, 2007.

(51) Int. Cl.
*G06F 19/00* (2011.01)
(52) U.S. Cl. ........................................... 700/132
(58) Field of Classification Search ........... 700/130–133
See application file for complete search history.

(56) References Cited

U.S. PATENT DOCUMENTS

| | | | |
|---|---|---|---|
| 5,163,006 A | 11/1992 | Deziel | |
| 5,163,007 A | 11/1992 | Slilaty | |
| 5,559,709 A | 9/1996 | Ohno | |
| 5,680,314 A | 10/1997 | Patterson | |
| 5,768,135 A | 6/1998 | Park | |
| 5,930,769 A * | 7/1999 | Rose | 705/26.81 |
| 5,956,525 A | 9/1999 | Minsky | |
| 6,473,671 B1 | 10/2002 | Yan | |
| 6,665,577 B2* | 12/2003 | Onyshkevych et al. | 700/130 |
| 6,701,207 B1* | 3/2004 | Gazzuolo | 700/132 |
| 7,020,538 B2* | 3/2006 | Luhnow | 700/132 |
| 7,242,999 B2* | 7/2007 | Wang | 700/132 |
| 7,617,016 B2* | 11/2009 | Wannier et al. | 700/132 |
| 7,623,938 B2* | 11/2009 | Luhnow et al. | 700/132 |
| 2002/0103566 A1* | 8/2002 | Gadson | 700/132 |
| 2002/0138170 A1* | 9/2002 | Onyshkevych et al. | 700/130 |
| 2004/0186611 A1* | 9/2004 | Wang | 700/132 |
| 2005/0080505 A1* | 4/2005 | Luhnow | 700/132 |
| 2006/0195219 A1* | 8/2006 | Luhnow et al. | 700/132 |
| 2006/0287877 A1* | 12/2006 | Wannier et al. | 705/1 |
| 2007/0032898 A1* | 2/2007 | Wang | 700/132 |

OTHER PUBLICATIONS

"Do You Really Know Your Pattern Size? from Simplicity, McCalls, Vogue/Butterick"; http://www.simplicity.com/section/fittips/fitbrochure/fitbroch.pdf, 1988.
Size Designation of Clothes—Women's and girls' outerwear garments; International Organization for Standardization ISO 3637: 1977; Published Oct. 15, 1990.
Standard Tables of Body Measurements for Women Aged 55 and Older (All Figure Types); ASTM International; Designation: D 5586-01.
Standard Tables of Body Measurements for Boys, Sizes 8 to 14 Slim and 8 to 20 Regular; ASTM International; Designation: D 6458-99.

(Continued)

*Primary Examiner* — Nathan Durham
(74) *Attorney, Agent, or Firm* — Lowe Graham Jones PLLC

(57) ABSTRACT

A method for modifying standard ANSI body sizing charts extrapolation sizes outside of the standard sizes if necessary. In a subsequent step, the user may incorporate different upper and lower body sizes. Correction factors are then applied if a tall/short, full/slender body type is selected. A new chart is output to the user in human readable form.

5 Claims, 16 Drawing Sheets

OTHER PUBLICATIONS

Standard Tables of Body Measurements for Men Sizes Thirty-Four to Sixty (34 to 60) Regular; ASTM International; Designation: D 6240-98.

Standard Tables of Body Measurements for Girls, Sizes 7 to 16; ASTM International; Designation: D 6192-98.

Standard Tables of Body Measurements for Children, Sizes 2 to 6x/7; ASTM International; Designation: D 5826-00.

Standard Tables of Body Measurements for for Adult Female Misses Figure Type, Sizes 2-20; ASTM International; Designation: D 5585-95 (Reapproved 2001).

A Survey of Standards for the US Fiber/Textile/Apparel Industry, Craig G. Pawlak, U.S. Department of Commerce, Technology Admin., National Institutes of Standards; Apr. 1996.

\* cited by examiner

Standard Sizes
Find the standard sizes you think best fit you.
All values in inches.

Select Body Shape

[Misses' ▼]

Upper Body Size [2 ▼]

Lower Body Size [2 ▼]

Height:
○ Tall  ⊙ Standard  ○ Petite

Fullness:
○ Plus  ⊙ Standard  ○ Slim

To remove your measurements and start again, press [Clear]

Measurement Set Name
[girls 14]

[Help] [Save] [Done] [Advanced >>]

FIG. 1

Standard Sizes

Find the standard sizes you think best fit you.
All values in inches.

Select Body Shape

Misses'

Selected size chart
Misses'
Women's
Men's
Girl's
Boy's

○ Petite

Fullness:
○ Plus    ⦿ Standard    ○ Slim

To remove your measurements and start again, press [Clear]

Measurement Set Name
[girls 14]

[Help] [Save] [Done] [Advanced >>]

FIG.2

Standard Sizes
Find the standard sizes you think best fit you.
All values in inches.

Select Body Shape

[ Men's ▽ ]

Chest Size [ -- ▽ ]

Waist Size [ -- ▽ ]

Height:
○ Tall  ⊙ Standard  ○ Petite

Fullness:
○ Plus  ⊙ Standard  ○ Slim

To remove your measurements and start again, press [Clear]

Measurement Set Name
[ ]

[Help] [Save] [Done] [Advanced >>]

FIG.4

Standard Sizes

Find the standard sizes you think best fit you.
All values in inches.

Select Body Shape

[ Men's ▼ ]

Chest Size        [ -- ▼ ]

Waist Size

Height:
○ Tall    ⦿ Standard

Fullness:
○ Plus    ⦿ Standard

To remove your measurements and start ag...    [ Clear ]

Measurement Set Name

[ _____ ]

[ Help ] [ Save ] [ Done ] [ Adv... ]

Dropdown values: --, 34, 35, 36, 37, 38, 39, 40, 41, 42, 43, 44, 45, 46, 47, 48, 49, 50, 51, 52, 53, 54, 55, 56, 57, 58, 59, 60

FIG. 5

Standard Sizes
Find the standard sizes you think best fit you.
All values in inches.

Select Body Shape
Boy's ▼

Upper Body Size [-- ▼]

Lower Body Size [-- ▼]

Height:
○ Tall   ⦿ Standard   ○ Petite

Fullness:
○ Plus   ⦿ Standard   ○ Slim

To remove your measurements and start again, press [Clear]

Measurement Set Name
[                    ]

[Help] [Save] [Done] [Advanced >>]

Standard Sizes
Find the standard sizes you think best fit you.
All values in inches.

Select Body Shape

[Girl's ▼]

Upper Body Size [-- ▼]

Lower Body Size [-- ▼]

Height:
○ Tall   ⊙ Standard   ○ Petite

Fullness:
○ Plus   ⊙ Standard   ○ Slim

To remove your measurements and start again, press [Clear]

Measurement Set Name
[_____]

[Help]  [Save]  [Done]  [Advanced >>]

Standard Sizes
All values in inches.

| Field | Value |
|---|---|
| Body Type | Misses' |
| Named Size | Medium |
| US Size | 6 |
| UK Size | 8 |
| France Size | 36 |
| Germany Size | 34 |
| Italy Size | 40 |
| Australia Size | 10 |
| Japan Size | 9 |

Height: ○ Tall  ⦿ Standard  ○ Petite
Fullness: ○ Plus  ⦿ Standard  ○ Slim

[Help] [Save] [Done] [Advanced >>]

FIG.10

| ANSI WOMAN OVER 55 BODY SIZE MEASUREMENT CHARTS | | | | | | | | | |
|---|---|---|---|---|---|---|---|---|---|
| SIZE--> | 6 | 8 | 10 | 12 | 14 | 16 | 18 | 20 | 22 |
| BUST | 30.66 | 31.45 | 32.6 | 34.18 | 35.68 | 37.22 | 39.13 | 44.01 | 43.23 |
| WAIST | 26.64 | 27.22 | 28.48 | 29.81 | 31.06 | 32.57 | 34.48 | 36.97 | 39.32 |
| HIGH HIP | 33.78 | 33.83 | 34.75 | 36.43 | 37.62 | 39.07 | 41.21 | 43.49 | 44.54 |
| HIP | 35.67 | 35.51 | 36.4 | 37.79 | 38.92 | 40.03 | 41.61 | 43.46 | 44.82 |
| MID-NECK | 11.99 | 12.27 | 12.4 | 12.82 | 13.16 | 13.5 | 13.83 | 14.5 | 14.8 |
| NECK BASE | 14.96 | 15.13 | 15.33 | 15.49 | 15.88 | 16.3 | 16.53 | 17.17 | 17.22 |
| ARMSCYE | 15.43 | 15.85 | 16.43 | 16.58 | 17.22 | 17.65 | 18.23 | 18.87 | 19.53 |
| UPPER ARM | 10.08 | 10.26 | 10.66 | 11.27 | 11.73 | 12.27 | 12.85 | 13.64 | 14.08 |
| ELBOW | 9.51 | 9.53 | 9.93 | 10.18 | 10.51 | 10.7 | 11.08 | 11.6 | 11.79 |
| WRIST | 5.92 | 5.9 | 5.98 | 6.12 | 6.24 | 6.36 | 6.52 | 6.7 | 6.85 |
| THIGH-MAX | 20.17 | 20.21 | 21 | 22 | 22.5 | 23.1 | 23.92 | 25.05 | 25.64 |
| THIGH-MID | 17.51 | 17.66 | 18.68 | 19.34 | 19.82 | 20.36 | 20.92 | 21.87 | 22.42 |
| KNEE | 13.43 | 13.43 | 13.86 | 14.8 | 14.56 | 14.94 | 15.44 | 15.98 | 16.37 |
| CALF | 12.32 | 12.62 | 12.76 | 13.25 | 13.58 | 13.84 | 14.43 | 14.86 | 15.23 |
| ANKLE | 9.09 | 9.15 | 9.18 | 9.25 | 9.5 | 9.52 | 9.75 | 10 | 10.18 |
| VERT.TRUNK | 57.94 | 57.61 | 58.59 | 59.94 | 61.18 | 62.07 | 65.53 | 65.14 | 66.64 |
| CROTCH LENGTH | 27.02 | 27.17 | 27.34 | 28.02 | 29.04 | 29.38 | 30.55 | 30.2 | 31.85 |
| HEIGHT | 62.7 | 63.43 | 64 | 64.52 | 65 | 65.59 | 66.1 | 66.42 | 67.08 |
| CERVICALE HT. | 55.11 | 55.26 | 55.79 | 56.37 | 57.09 | 59.64 | 58.28 | 58.76 | 59.42 |
| WAIST HEIGHT | 39.38 | 39.54 | 39.8 | 40.43 | 40.84 | 41.17 | 41.53 | 41.96 | 42.45 |
| HIP HIP HEIGHT | 36.22 | 36.48 | 36.99 | 37.66 | 37.82 | 38.25 | 38.48 | 38.49 | 39 |
| HIP HEIGHT | 32.57 | 33.27 | 33.7 | 34.15 | 34.34 | 34.63 | 34.61 | 34.78 | 34.96 |
| CROTCH HEIGHT | 28.91 | 29.19 | 29.52 | 29.76 | 29.82 | 30.19 | 30.18 | 30.23 | 30.65 |
| KNEE HEIGHT | 16.88 | 17.18 | 17.31 | 17.59 | 17.76 | 17.99 | 18.09 | 18.1 | 18.48 |
| ANKLE HEIGHT | 2.49 | 2.55 | 2.58 | 2.59 | 2.68 | 2.73 | 2.71 | 2.72 | 2.84 |
| FRONT WAIST LENGTH | 12.94 | 13.09 | 13.29 | 13.44 | 13.69 | 13.96 | 14.17 | 14.56 | 14.88 |
| BACK WAIST LENGTH | 15.72 | 15.71 | 15.98 | 15.95 | 16.24 | 16.47 | 16.57 | 16.8 | 16.98 |
| ACROSS SHOULDER | 14.62 | 14.8 | 15.18 | 15.45 | 15.84 | 16.01 | 16.28 | 16.66 | 17.19 |
| CROSS-BACK WIDTH | 14.21 | 14.2 | 14.28 | 14.57 | 14.86 | 15.44 | 15.95 | 16.62 | 17.32 |
| CROSS-CHEST WIDTH | 13.54 | 13.53 | 13.52 | 14 | 14.25 | 14.56 | 15.02 | 15.75 | 16 |
| SHOULDER LENGTH | 4.78 | 5.09 | 5.08 | 5.25 | 5.15 | 5.31 | 5.31 | 5.39 | 5.47 |
| SHOULDER SLOPE | 21 | 22 | 22 | 22 | 23 | 23 | 22 | 21 | 21 |
| SHOULDER TO WRIST | 22.41 | 22.7 | 23.02 | 23.23 | 23.54 | 23.86 | 24.08 | 24.24 | 24.73 |
| SHOULDER TO ELBOW | 12.68 | 12.84 | 13.42 | 13.46 | 13.59 | 13.71 | 13.87 | 13.99 | 14.21 |
| BUST SPAN | 6.67 | 6.82 | 7.03 | 7.29 | 7.51 | 7.73 | 8.24 | 8.64 | 8.84 |
| NECK TO BUST | 10.43 | 10.62 | 10.68 | 11.02 | 11.4 | 11.68 | 11.92 | 12.09 | 12.34 |
| SCYE DEPTH | 6.86 | 7.09 | 6.98 | 7.09 | 7.22 | 7.47 | 7.68 | 8.06 | 8.12 |
| WEIGHT | 103 | 107 | 115 | 125 | 134 | 144 | 159 | 174 | 189 |
| WHITE CELLS - VERTICAL BODY MEASUREMENTS | | | | | | | | | |
| GRAY CELLS - GIRTH BODY MEASUREMENTS | | | | | | | | | |

TABLE 1: ANSI STANDARD SIZES 6-22 FOR WOMEN OVER 55

|  | STEP 3 | STEP 4 | STEP 5 | STEP 6 |
|---|---|---|---|---|
| UPPER BODY SIZE --> | 6 | 6 | 6 | 6 |
| LOWER BODY SIZE --> | 6 | 10 | 10 | 10 |
| HEIGHT ADJUST | STD. | STD. | TALL | TALL |
| GIRTH ADJUST | STD. | STD. | STD. | PLUS |
| BUST | 30.66 | 30.66 | 30.66 | 33.1128 |
| WAIST | 26.64 | 28.48 | 28.48 | 30.7584 |
| HIGH HIP | 33.78 | 34.75 | 34.75 | 37.53 |
| HIP | 35.67 | 36.4 | 36.4 | 39.312 |
| MID-NECK | 11.99 | 11.99 | 11.99 | 12.9492 |
| NECK BASE | 14.96 | 14.96 | 14.96 | 16.1568 |
| ARMSCYE | 15.43 | 15.43 | 16.0472 | 16.5101 |
| UPPER ARM | 10.08 | 10.08 | 10.08 | 10.8864 |
| ELBOW | 9.51 | 9.51 | 9.51 | 10.2708 |
| WRIST | 5.92 | 5.92 | 5.92 | 6.3936 |
| THIGH-MAX | 20.17 | 21 | 21 | 22.68 |
| THIGH-MID | 17.51 | 18.68 | 18.68 | 20.1744 |
| KNEE | 13.43 | 13.86 | 13.86 | 14.9688 |
| CALF | 12.32 | 12.76 | 12.76 | 13.7808 |
| ANKLE | 9.09 | 9.18 | 9.18 | 9.9144 |
| VERT.TRUNK | 57.94 | 58.59 | 62.1054 | 58.59 |
| CROTCH LENGTH | 27.02 | 27.34 | 28.9804 | 27.34 |
| HEIGHT | 62.7 | 63.325 | 67.1245 | 63.325 |
| CERVICALE HT. | 55.11 | 55.79 | 59.1374 | 55.79 |

| | | | | |
|---|---|---|---|---|
| WAIST HEIGHT | 39.38 | 39.8 | 42.188 | 39.8 |
| HIP HIP HEIGHT | 36.22 | 36.99 | 39.2094 | 36.99 |
| HIP HEIGHT | 32.57 | 33.7 | 35.722 | 33.7 |
| CROTCH HEIGHT | 28.91 | 29.52 | 31.2912 | 29.52 |
| KNEE HEIGHT | 16.88 | 17.31 | 18.3486 | 17.31 |
| ANKLE HEIGHT | 2.49 | 2.58 | 2.7348 | 2.58 |
| FRONT WAIST LENGTH | 12.94 | 13.29 | 18.0874 | 13.29 |
| BACK WAIST LENGTH | 15.72 | 15.98 | 16.9388 | 15.98 |
| ACROSS SHOULDER | 14.62 | 14.62 | 14.62 | 15.7896 |
| CROSS-BACK WIDTH | 14.21 | 14.21 | 14.21 | 15.3468 |
| CROSS-CHEST WIDTH | 13.54 | 13.54 | 13.54 | 14.6232 |
| SHOULDER LENGTH | 4.78 | 4.78 | 4.78 | 5.1624 |
| SHOULDER SLOPE | 21 | 21 | 21 | 21 |
| SHOULDER TO WRIST | 22.41 | 22.41 | 22.41 | 22.41 |
| SHOULDER TO ELBOW | 12.68 | 12.68 | 12.68 | 12.68 |
| BUST SPAN | 6.67 | 6.67 | 6.67 | 7.2036 |
| NECK TO BUST | 10.43 | 10.43 | 10.8472 | 11.1601 |
| SCYE DEPTH | 6.86 | 6.86 | 6.86 | 6.86 |

SIZE 6 STANDARD VALUES IN WHITE CELLS

LOWER BODY SIZE 10

ADJUSTED +6% FOR HEIGHT

ADJUST +8% FOR GIRTH

NOTE: ARMSCYE AND NECK TO BUST ARE ADJUSTED FOR BOTH HEIGHT AND GIRTH

TABLE 2: MODIFICATION OF ANSI CHART NUMBERS USING THIS METHOD

FIG.12B

METHOD FOR CREATION OF DETAILED BODY MEASUREMENT PARTS FROM EXTRAPOLATION OF STANDARD CHART DATA BASED ON GENERIC BODY ATTRIBUTES

CROSS-REFERENCE TO RELATED APPLICATIONS

This non-provisional patent application claims priority from and the benefit of the filing date of co-pending Provisional Patent Application Ser. No. 60/900,485 filed Feb. 9, 2007 titled "Method for Creation of Detailed Body Measurement Parts from Extrapolation of Standard Chart Data Based on Generic Body Attributes" by Robert Clardy and Greg Hightower in accordance with 35 U.S.C. §§119(e) and 120.

TECHNICAL FIELD

The present invention relates generally to a computer-aided design of custom fit sewing patterns and the manufacturing of custom apparel. More particularly, this invention provides an apparatus for the automated production of custom garments for a specific individual's needs.

BACKGROUND OF THE INVENTION

The garment making industry has historically used a number of standard body measurement charts to produce garments. Various industry and governmental (such as the charts from the American National Standards Institute or ANSI) institutions have developed these charts over time. At this time, there are several hundred such standard charts available for different body types (child, girl, misses, woman, woman over 55, etc.) But, these charts have never fully represented the broad diversity of actual body types. They all assume an average height of 5' 8" for all women in the world, for instance. Nor do these standard charts keep up with the changing shape of the average body as it changes with the evolving health, diet, and exercise habits of our populace. The challenge for the "average" clothing buyer to find clothes that actually fit well has become more and more difficult, resulting in trends towards poorer fit with fewer options available for the short, the tall, the skinny, and the wider clothing buyers.

BRIEF SUMMARY OF THE INVENTION

A process to automatically generate "standard" measurement charts for the many people that cannot now get a good fit from the current more limited standardized body measurement charts is described. These new standard measurement charts can allow for different upper and lower body "standard" sizes and are algorithmically adjusted for differences in girth or height from the existing governmental standards. The resulting charts are consistent with ANSI standard charts, but also provide the variations required by those that are taller, shorter, broader, or skinnier than the averages. Further, these charts also accommodate those with "V" shaped bodies (bigger top, smaller bottom) or "A" shaped bodies (bigger hip size than bust and shoulder size) as well as the many other variations from the mythical standard.

These charts can be printed and used by home sewers for personal use. They can be used by custom clothiers, small lot garment makers, or by large lot garment makers interested in keeping up with body shape trends that are evolving faster than government and industry studies can produce new studies and standards.

BRIEF DESCRIPTION OF THE DRAWINGS

Figure 7:
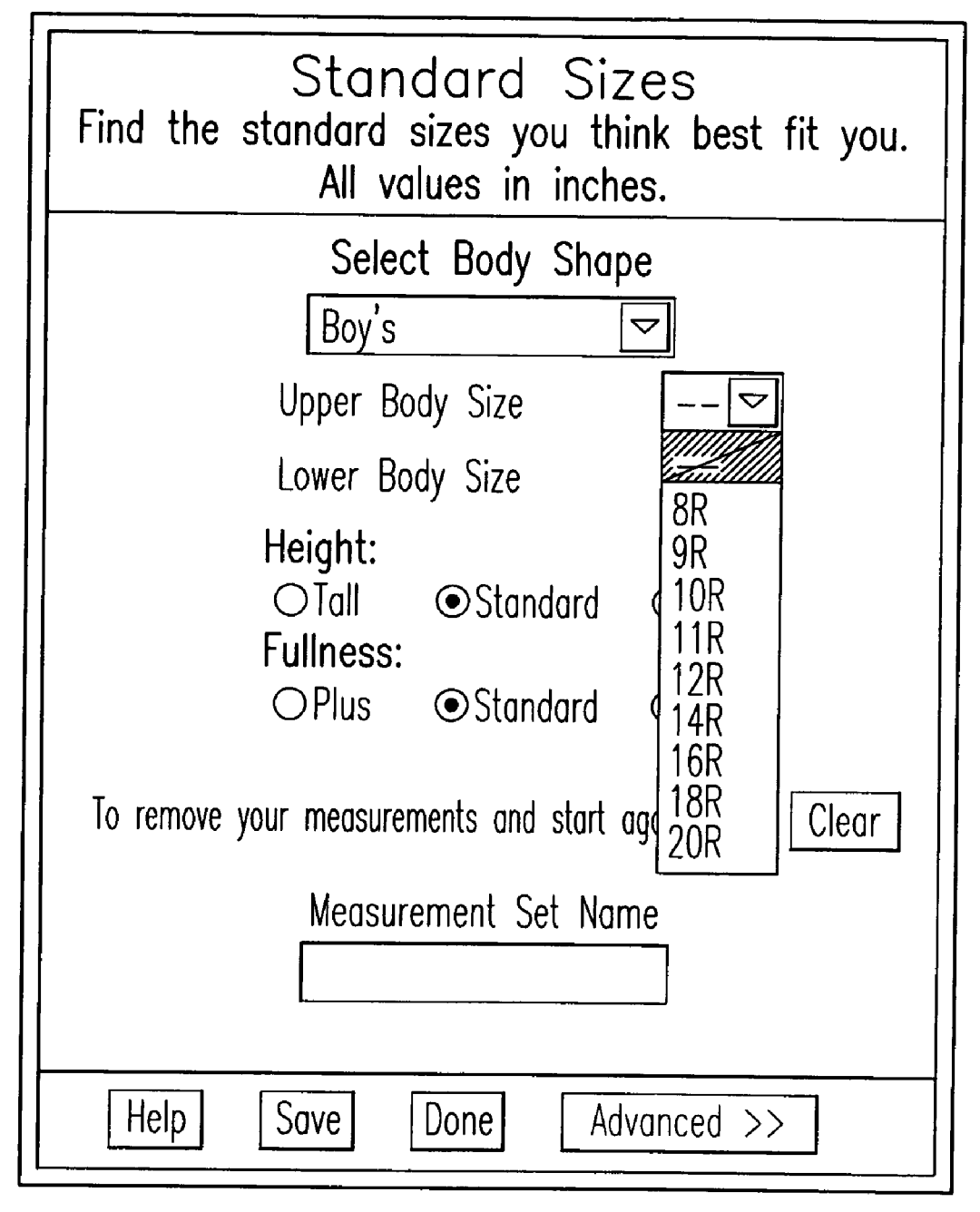
Figure 9:
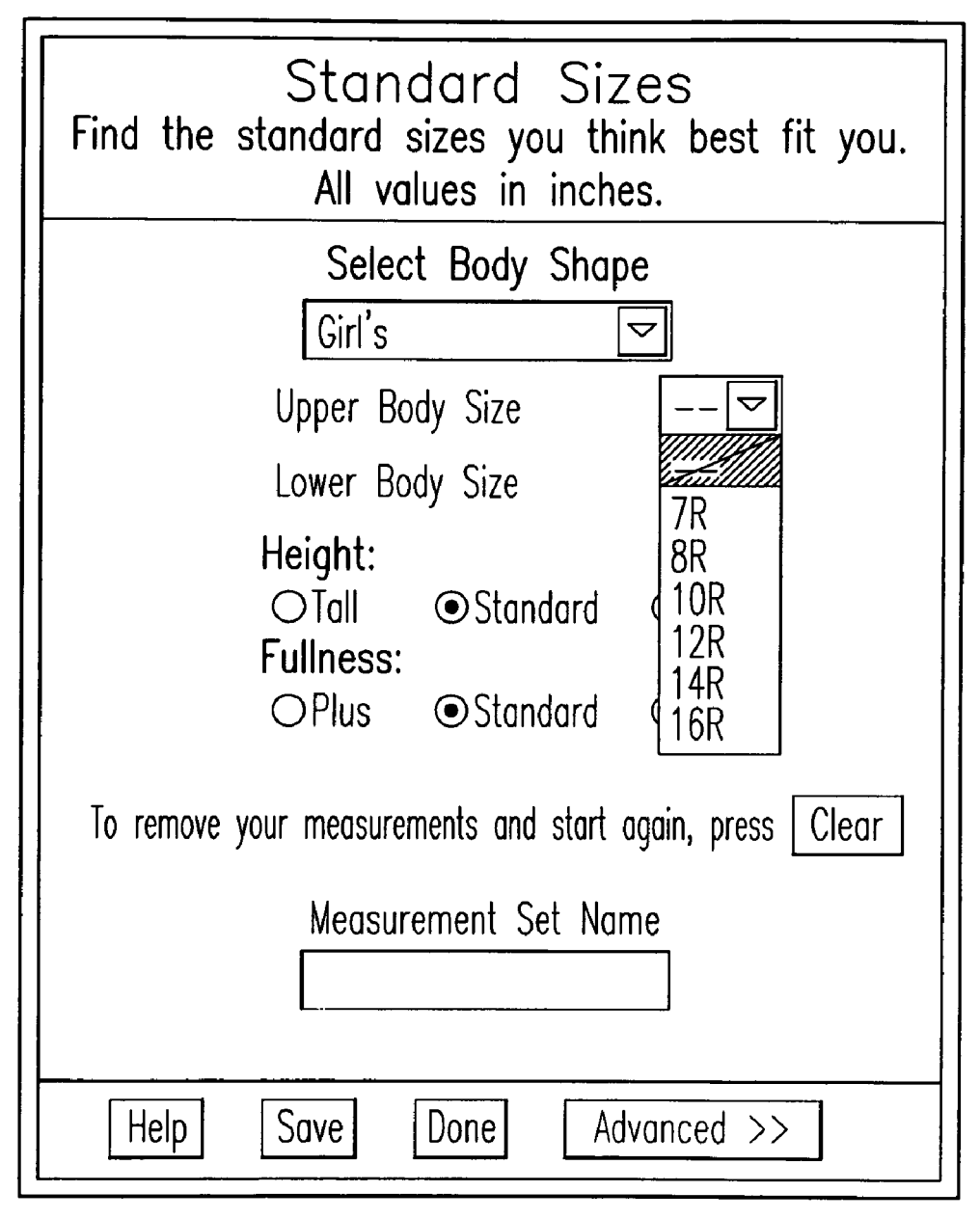

FIGS. 1-9 show a user interface implemented in a personal digital computer reflecting:

For the Misses' and Woman's body shapes the user can choose a separate upper and lower body size from size 2 to 40 with Tall, Standard, and Petite height modifiers and Plus, Standard, and Slim fullness modifiers (FIGS. 1-4);

For Men's body shape the user can choose chest and waist sizes as numerics, a figure commonly known, and then choose Tall, Standard, and Short height modifiers along with Plus, Standard, and Slim fullness modifiers (FIG. 5);

For Boy's body shape the user can choose between an upper and lower body size, commonly known, and the same height and fullness modifiers as the Men's (FIGS. 6, 7); and For Girl's body shape the user can choose between an upper and lower body size, commonly known, and the same height and fullness modifiers as the Women's (FIGS. 8, 9).

FIG. 10 illustrates the variations in standard sizing using named sizes (off-the-rack sizing) as well as various international standard sizes that can also be modified by the method described in this patent by converting those sizes to ANSI sizes through generally available algorithms.

FIG. 11 is a reproduction of a standard ANSI Table, sizes 6-22 for women over 55 years of age.

FIG. 12 is a modified chart resulting from application of the present invention to the chart of FIG. 11.

Figure 3:
Figure 13A:
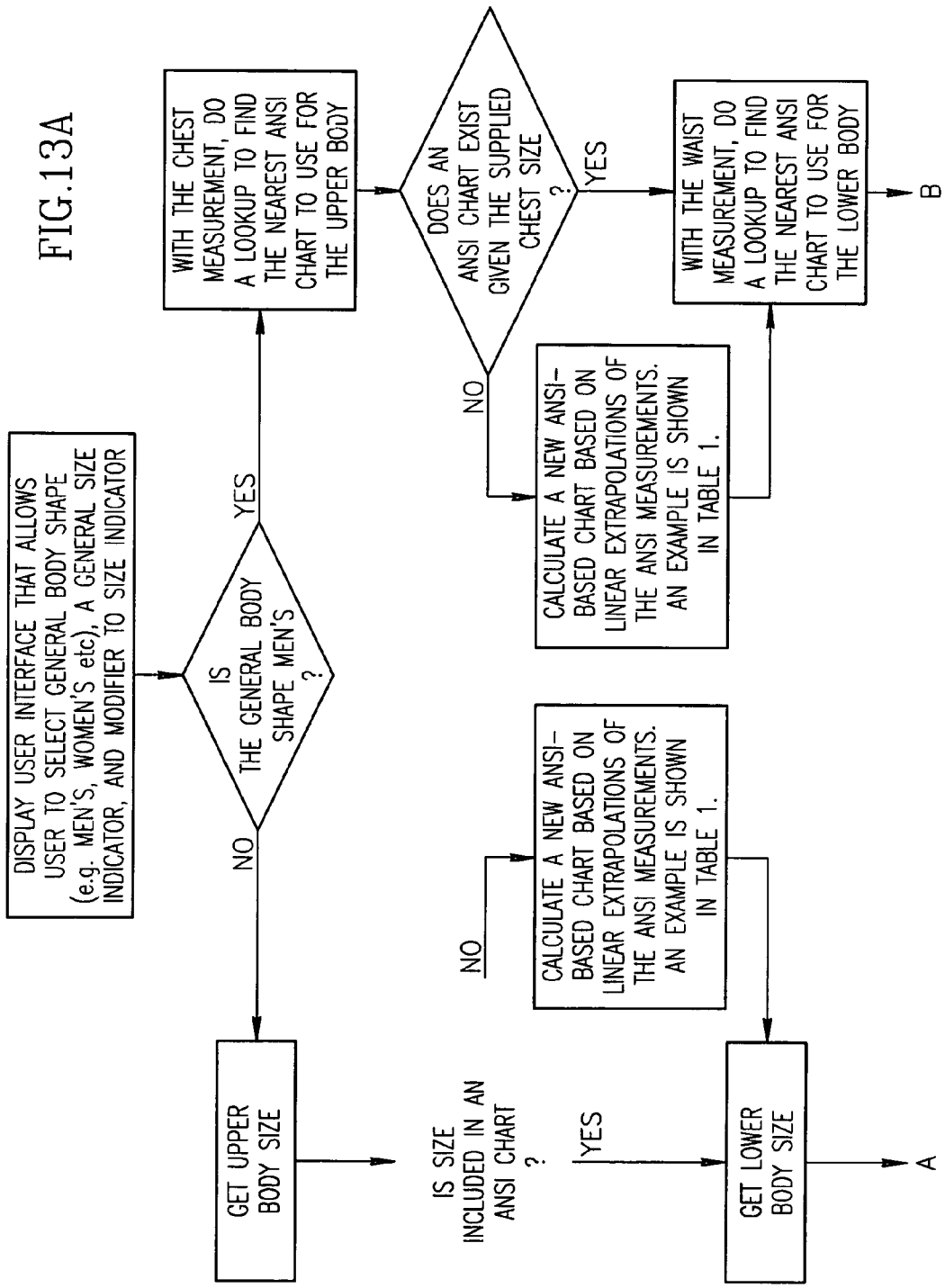
Figure 13B:
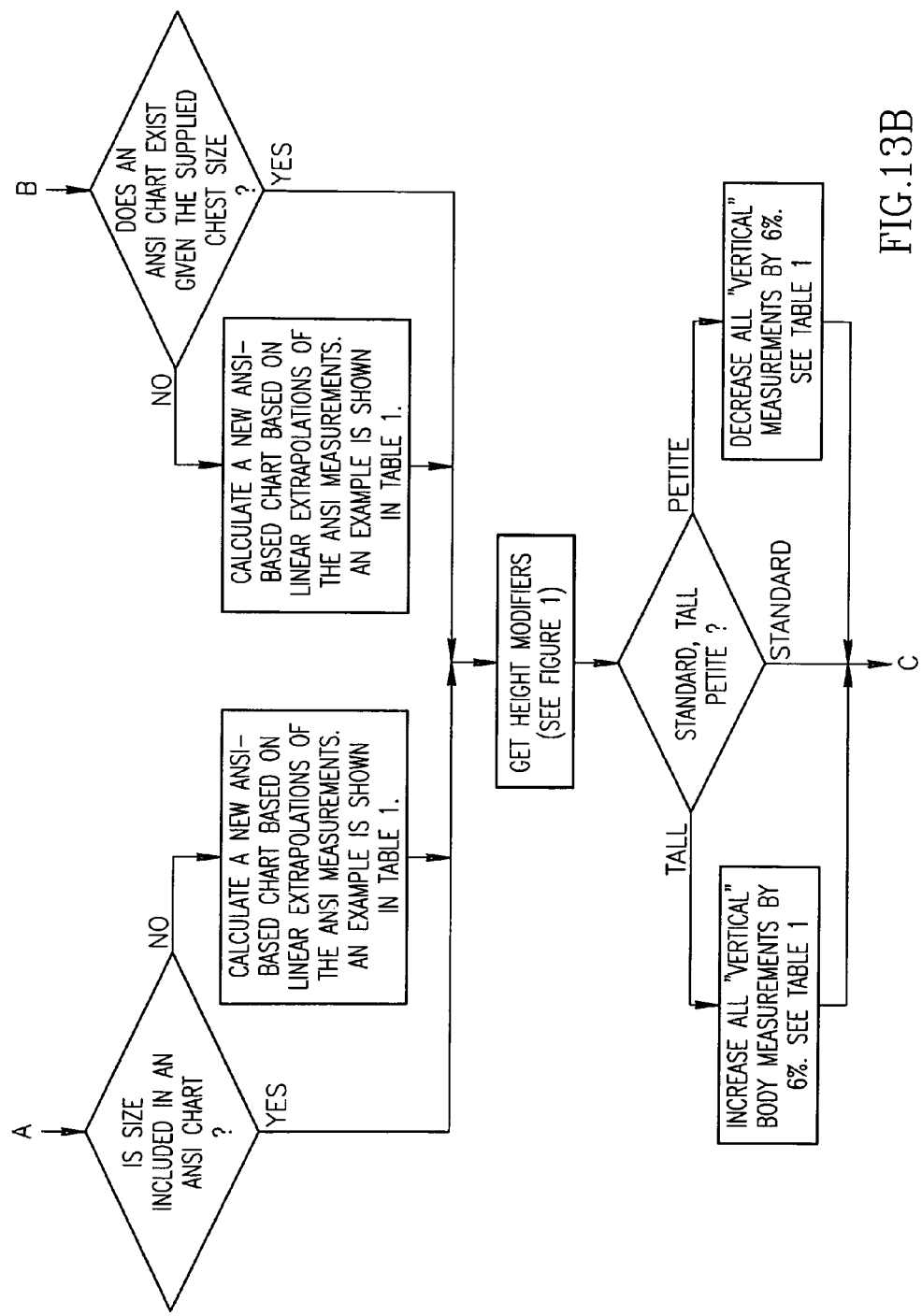
Figure 13C:
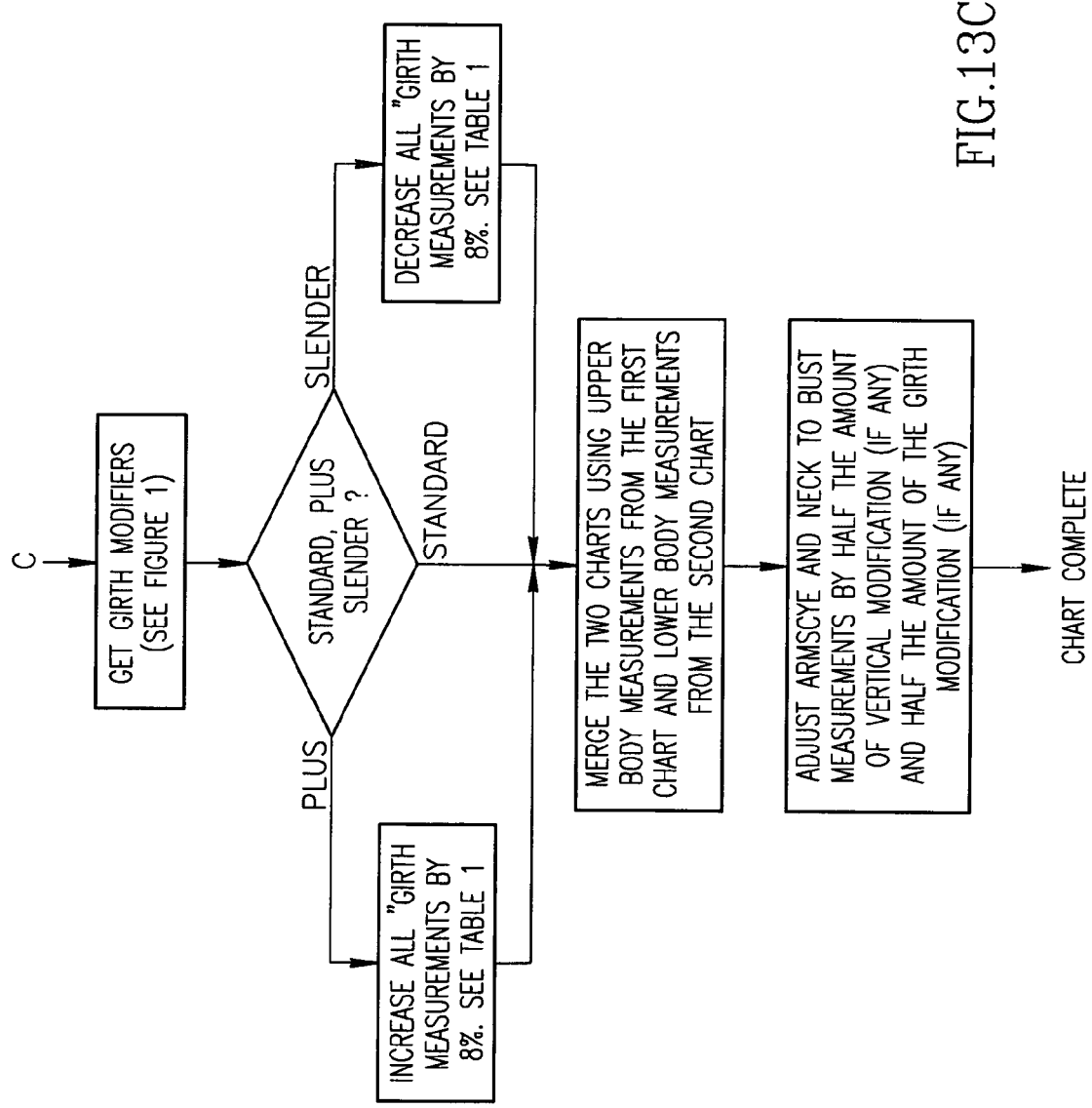

FIG. 13 is a flow chart describing the method of the present invention.

DETAILED DESCRIPTION OF THE PREFERRED EMBODIMENTS

A method for generating customized garment measurement charts for individuals who do not closely fit the standard ANSI body measuring charts is described at FIGS. 1-11 of the attached drawings. The method consisting of the following steps.

1. Create a user interface such as shown in FIGS. 1-10. This user interface has the functionality to allow the user to select a general body shape, a general size indicator, and modifiers to the general size indicator.
2. The body shape includes the types: women's, men's, misses', boy's, girl's as shown in FIG. 1.
3. The general sizing indicator is split into upper and lower body measurements as shown in FIGS. 3-9. For all but the men's, standard numerical sizing such as "12" is sufficient for upper and lower body sizing. For Men's, chest and waist size are easier for a male to supply.
4. Please see the flow chart illustrated in FIG. 11 for a detailed description of the process with reference to the following examples.

Example 1

FIG. 11 (Table 1) illustrates the raw data available from ANSI for women's standard body measurements. This particular chart is for women over 55, sizes 6 through. The 9 sizes available means that 9 general body shapes are covered by the ANSI charts for older women. There are similar charts for men, boys, and girls. Between them, fewer than 50 body shapes can be described reasonably accurately with these measurements.

This data was gathered over decades of research and therefore cannot accurately reflect the changing sizing standards of the current year. In recent years, body sizes have been increasing and sizes larger than 22 are now more common than when this research was done. Further, the ANSI charts make no provision for body types that are not totally top to bottom proportional. A woman with an 'A' body type—narrow shoulders and wider hips—cannot be served by these charts, nor could a person with a 'V' body shape—big shoulders, and narrow hips. And, finally, the many variations of tall and petite, slender and plus sized body types are not considered in the ANSI standard charts.

The method described deals with each of these limitations through a 6 step process illustrated in Table 2 of FIG. 12 and the flow chart shown in FIG. 13. Those are method steps:

1. Calculate a linear extrapolation multiple that can be used to estimate sizes higher or lower than the standard sizes provided by ANSI for example in FIG. 11 (Table 1), which appear in the rightmost column of Table 1. For example, the extrapolation multiple for the Bust measurement is 1.397" for each successive even size number. Others can be calculated the same way.
2. Get the user's upper body size choice. If that choice is within the ANSI chart, start with those chart numbers. If the number is higher than the ANSI charts cover, calculate a new chart using the highest ANSI chart numbers extended to the higher size using multiples of the extrapolation factors.
3. We now have one standard size chart. An example of that appears in FIG. 12 (Table 2). The column labeled "Step 3" includes the numbers taken from the Size 6 column of the ANSI table above.
4. The next step permits the selection of an alternate size for the lower body. In this case, we will use size 10 for the lower body. This represents an 'A' shaped body,
5. Next, the user may select height variation (tall or petite). Tall users will have all of the their vertical body measurements (those that are white in Table 1) increased by 6% while petite users will have their vertical measurements reduced by 6%. The "Step 5" column in FIG. 12, Table 2 shows the results of this. Those vertical body measurements that were scaled are highlighted in dark grey.
6. The final step is the selection of a girth modifier (plus or slender). The plus selection will cause all girth measurements (those highlighted in light grey in Table 1) to be increased by 8% while the slender selection decreases those by 8%. The "Step 6" column in Table 2 shows the results of this final adjustment, with the girth modified measurements highlighted in black. Also, there are 2 body measurements that are adjusted for both height (3%) and girth (4%) selections. Those are illustrated with cells with a thick border.

As the final column of FIG. 12 illustrates, all but one measurement have been recalculated based on the user selections outlined above (shoulder slope does not change). The net result is a standard measurement chart for someone with a size 6 upper body, size 10 lower body, who is also big and tall. While the ANSI chart for women over 55 included 9 body shapes, this approach provides standardized measurements for a comparable expansion in body types.

As is shown in the flow chart of FIG. 13, a final step may include adjusting the armscye and neck to bust measurement by one half the amount of the vertical measurement modifications of "Step 5" (i.e. ±3%) and one half of the girth modifications of "Step 6" (i.e. ±4%) respectively. Results are shown in a double box in FIG. 12. The method of FIG. 13 is preferable implemented in a digital computer.

Those of ordinary skill in the art will conceive of other alternate embodiments of the invention upon reviewing this disclosure. Thus, the invention is not to be limited to the above description, but is to be determined in scope by the claims which follow.

We claim:

1. A method for adjusting standard body size charts in a digital computer to produce a user customized size chart, comprising the steps of:

providing a computer user interface having means for inputting at least one of a user's body shape selected from Misses, Women's, Men's, Girl's and Boys;

when Misses' or Women's is input, inputting further data consisting of upper body size, lower body size, height and fullness;

when Men's is input, inputting further data consisting of chest size, waist size, height and fullness;

when one of Boy's or Girl's is input, inputting further data consisting of upper body size, lower body size, height and fullness;

selecting and inputting one of an standard size charts correlated to the input selection of Misses', Women's, Men's, Girl's and Boy's;

calculating a linear extrapolation multiple to sizes other than those provided on the selected table when a selected body size or chest size is outside of a size range on the selected chart and calculating a new chart using a highest or lowest set of size measurements on the selected chart when the user's inputs upper body size is larger or smaller than corresponding largest or lowest measurements on the selected chart using whole number multiples of the extrapolation multiple;

calculating an alternate lower body or waist size by applying a larger size chart for lower body measurements when a larger lower body size than upper body size has been selected inclusive of a converse selection;

modifying vertical body measurements from the selected chart by a positive vertical factor when a user height selection indicating a tall user is selected and by a negative vertical factor when a short user height is selected;

modifying girth, size from the selected chart by a positive girth factor when a slender user fullness is selected and a negative girth factor when a large user fullness is selected; and outputting a user customized size chart in human readable form including the modified lower body size, vertical body, sizes and girth sizes.

2. The method of claim 1, wherein the linear extrapolation multiple is 1.397.

3. The method of claim 1, wherein the vertical factor is 6%.

4. The method of claim 1, wherein the girth factor is 8%.

5. The method of claim 1 including the step of adjusting an armscye and a neck to bust measurement by one half of the vertical factor and one half of the girth factor, respectively.

* * * * *